United States Patent

Asada

[11] Patent Number: 5,083,992
[45] Date of Patent: Jan. 28, 1992

[54] AUTOMATIC TRANSMISSION

[75] Inventor: Toshiyuki Asada, Susono, Japan

[73] Assignee: Toyota Jidosha Kabushiki Kaisha, Toyota, Japan

[21] Appl. No.: 475,308

[22] Filed: Feb. 5, 1990

[30] Foreign Application Priority Data

| Feb. 3, 1989 | [JP] | Japan | 1-25319 |
| Feb. 3, 1989 | [JP] | Japan | 1-25320 |
| Feb. 3, 1989 | [JP] | Japan | 1-25321 |
| Feb. 3, 1989 | [JP] | Japan | 1-25322 |
| Mar. 10, 1989 | [JP] | Japan | 1-58406 |
| Mar. 15, 1989 | [JP] | Japan | 1-63385 |
| Apr. 27, 1989 | [JP] | Japan | 1-108183 |
| May 10, 1989 | [JP] | Japan | 1-116796 |

[51] Int. Cl.$^5$ ............................................. F16H 57/10
[52] U.S. Cl. ................................. 475/278; 475/284; 475/288
[58] Field of Search ............... 475/275, 277, 278, 284, 475/288, 311, 323, 329, 330

[56] References Cited

U.S. PATENT DOCUMENTS

| 3,503,282 | 3/1970 | Peterson | 475/276 |
| 3,811,343 | 5/1974 | Mori et al. | 475/284 X |
| 3,824,876 | 7/1974 | Mori et al. | 475/276 |
| 3,863,524 | 2/1975 | Mori et al. | 475/278 X |
| 3,946,623 | 3/1976 | Murakami et al. | 475/276 |
| 4,233,861 | 11/1980 | Gaus et al. | 475/56 |
| 4,660,439 | 4/1987 | Hiraiwa | 475/276 |
| 4,774,856 | 10/1988 | Hiraiwa | |

FOREIGN PATENT DOCUMENTS

| 0121259 | 10/1984 | European Pat. Off. |
| 0164553 | 12/1985 | European Pat. Off. |
| 2751312 | 6/1978 | Fed. Rep. of Germany |
| 3511180 | 10/1985 | Fed. Rep. of Germany |
| 59-26645 | 2/1984 | Japan |

Primary Examiner—Leslie A. Braun
Assistant Examiner—Benjamin Levi
Attorney, Agent, or Firm—Oblon, Spivak, McClelland, Maier & Neustadt

[57] ABSTRACT

An automatic transmission, in which a gear train including a plurality of planetary gear sets each composed of a sun gear, a carrier and a ring gear is accommodated in a casing so that the transmission of a drive force from an input shaft to an output shaft may be changed to set a plurality of gears. The automatic transmission includes a first brake connected to the carrier of the first one of the plural planetary gear sets for fixing the same to the casing; a first clutch arranged at the same side as is the connecting position of the carrier and the first brake means with respect to the first planetary gear set for connecting the carrier selectively to a rotating member such as the sun gear, carrier or ring gear of one of other planetary gear sets; and a second clutch arranged closer to the first planetary gear set than it is to the first clutch for connecting the sun gear of the first planetary gear set selectively to the rotating member.

27 Claims, 12 Drawing Sheets

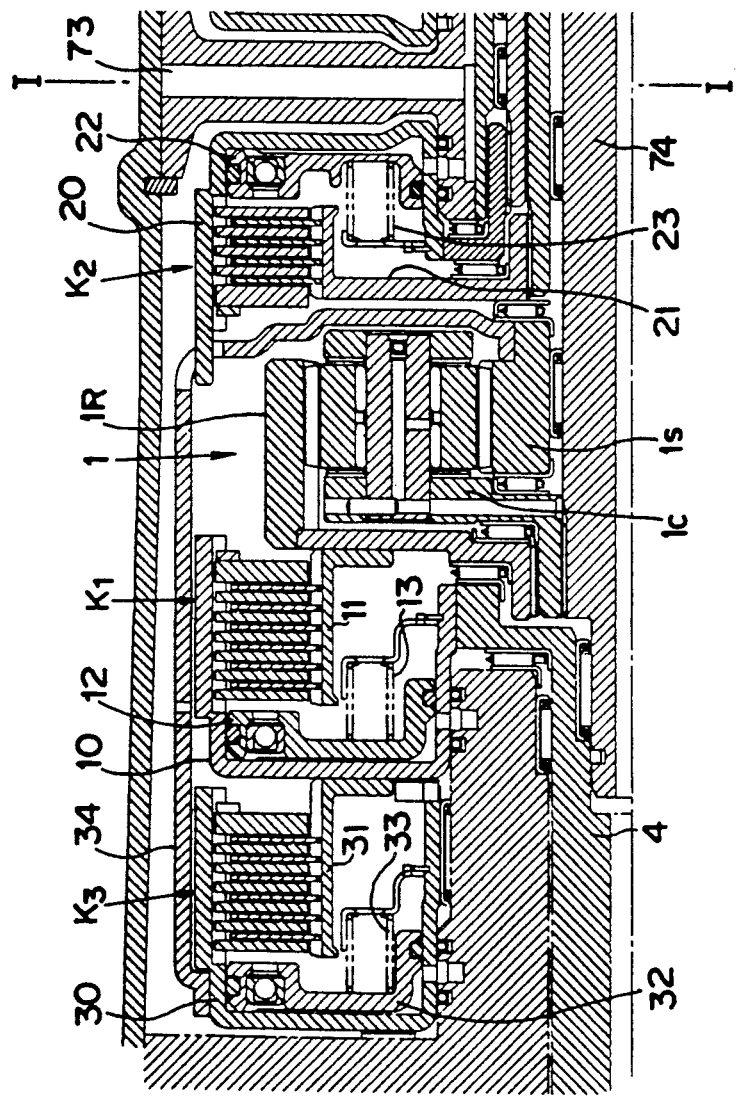

AUTOMATIC TRANSMISSION

BACKGROUND OF THE INVENTION

1. Field of the Invention

The present invention relates to an automatic transmission for an automobile and, more particularly, to an automatic transmission including a gear train composed of a plurality of planetary gear sets.

2. Description of the Prior Art

As is well known in the prior art, the gear trains of an automatic transmission are constructed of a plurality of planetary gear sets of single-pinion type, double-pinion type or Ravignaux type. For the larger number of the planetary gear sets to be used, the number of setable gears is accordingly increased the more to improve the power performance of the vehicle and the initial acceleration, whereas the structure is accordingly complicated to raise the weight and the production cost. For the smaller number of the planetary gear sets to be used, on the contrary, the structure is simplified, although the number of setable gears is decreased, so that the lighter product can be obtained at the lower cost. In the prior art, therefore, various endeavors have been made to satisfy the contradictory requirements for the increase in the number of the gears and for the simplification of the structure. In recent years, there has been proposed a gear train which can set five forward gears and one reverse gear or more gears by using three planetary gear sets.

One example of the proposals is described in U.S. Pat. No. 4,233,861. The gear train is equipped with one Ravignaux type planetary gear set and one single-pinion type planetary gear set. The Ravignaux type planetary gear set has its one pinion gear meshing with a first large-diameter sun gear and a ring gear and its other pinion gear meshing with a second small-diameter sun gear and the former pinion gear, and these gears are carried by a planetary carrier. On the other hand, the ring gear of the Ravignaux type planetary gear set is connected to the ring gear of the single-pinion type planetary gear set. The first sun gear is connected through a first clutch to an input shaft, and the carrier of the Ravignaux type planetary gear set is connected through a second clutch and a one-way clutch to the sun gear of the single-pinion type planetary gear set. There are further provided a third clutch for connecting the second sun gear and the input shaft, and a fourth clutch for connecting the carrier of the Ravignaux type planetary gear set and another input shaft. There are further provided a first brake for braking the rotations of the first sun gear, a second brake for braking the rotations of the sun gear of the single-pinion type planetary gear set, and a third brake for braking the rotations of the carrier of the Ravignaux type planetary gear set.

The automatic transmission described in the U.S. Pat. No. 4,233,861 can set five forward gears and one reverse gear. In order to change the gears from the forward third to fourth, the first clutch and the second brake have to be released, but the second clutch and the fourth clutch have to be engaged. These necessities have raised problems that shocks may occur during a change between those gears and that a delicate gear control is required to suppress the gear changing shocks. In this automatic transmission, moreover, the oil temperature may rise or the durability may drop, because the aforementioned second sun gear is rotated at a high speed for the forward fifth gear and the reverse gear.

The technical disadvantages thus far specified are expected to be eliminated to some extent from the automatic transmission including three planetary gear sets by interposing clutch means between any two of the rotating members of those planetary gear sets so that the rotating members may be connected, if necessary, or disconnected. An automatic transmission equipped with this clutch means is described in U.S. Pat. No. 4,660,439. This automatic transmission has its gear trains constructed of three single-pinion type planetary gear sets. The automatic transmission is equipped, as its clutches for connecting the rotating members of the planetary gear sets selectively, with a clutch for connecting the sun gear of the front planetary gear set and the sun gear of the center planetary gear set, a clutch for connecting the sun gear of the front planetary gear set and the carrier of the center planetary gear set, a clutch for connecting the carrier of the center planetary gear set and the sun gear of the rear planetary gear set, and a clutch for connecting the carrier of the front planetary gear set and the sun gear of the center planetary gear set. With these clutches thus provided, the number of setable gears can be increased while preventing the number of revolutions of any of the rotating members from being increased to a extremely large value. In the case of the gear change from forward second to third or from third to fourth, however, three or more clutches or brakes must have their engaged or released states switched to raise disadvantages that the gear changing shocks occur and that the control becomes difficult. In the structure described in the U.S. Pat. No. 4,660,439, moreover, either the clutch for connecting the sun gear of the front planetary gear set and the carrier of the center planetary gear set or the clutch for connecting the sun gear of the front planetary gear set and the carrier of the center planetary gear set is disposed radially internally of a cylindrical member for connecting the ring gear of the planetary gear set to another member so that its external diameter is restricted. In order to retain the necessary transmission torque capacity, the number of discs has to be increased in accordance with the restrictions upon the external diameter, thus inviting a disadvantage that the total length of the automatic transmission is increased. The pumping of the oil pressure to and from a servo mechanism to engage that clutch is accomplished from the radially inner side because the radially outer side is covered with the rotating member. The rotating shaft extending at the center has to be formed with oil passages for feeding lubricating oil to the planetary gear sets. Even if the oil passages are isolated liquid-tight by means of seal rings, there still remains a problem that the oil passage structures are remarkably complicated. If, moreover, the oil pressure is fed to the servo mechanisms through the inside of the rotating shaft, it is influenced by the centrifugal force established as the shaft rotates, thus raising a problem that the timing for engaging the clutch may fluctuate.

On the other hand, the clutch for connecting the sun gear of the aforementioned front planetary gear set and the carrier of the center planetary gear set may be interposed between another clutch for connecting the sun gears of the front planetary gear set and the center planetary gear set and the sun gear of the center planetary gear set. In the case of this structure, the connecting member between the sun gear of the center planetary gear set and the clutch for connecting the former to the sun gear of the front planetary gear set is elongated so that its weight and accordingly its moment of inertia are augmented. As a result, there arises a problem that the shocks and the durability of the clutches are adversely affected.

SUMMARY OF THE INVENTION

An object of the present invention is to provide an automatic transmission which can set at least five forward and one reverse gears without having its clutch means restricted unnecessarily as to external diameter.

Another object of the present invention is to provide an automatic transmission which can simplify the oil pressure supply passages to the clutch means and make rotation connecting members light.

These objects can be achieved by providing an automatic transmission, in which a gear train including a plurality of planetary gear sets each composed of a sun gear, a carrier and a ring gear is accommodated in a casing so that the transmission passages of a drive force from an input shaft to an output shaft may be changed to set a plurality of gears, which transmission comprising: first brake means connected to the carrier of the first one of said plural planetary gear sets for fixing the same to said casing; first clutch means arranged at the same side as is the connecting position of said carrier and said first brake means with respect to said first planetary gear set for connecting said carrier selectively to a rotating member such as the sun gear, carrier or ring gear of one of other planetary gear sets; and second clutch means arranged closer to said first planetary gear set that to said first clutch means for connecting the sun gear of said first planetary gear set selectively to said rotating member.

In the automatic transmission of this invention, the planetary gear set structure can be constructed of three planetary gear sets which are arrayed on a common axis. Of these three sets, moreover, one planetary gear mechanisms can be of the double-pinion type, and the remaining two planetary gear sets can be of the single-pinion type.

In the automatic transmission of this invention, therefore, the first clutch means for connecting the carrier of the first planetary gear set to another rotating member and the second clutch means for connecting the sun gear of the first planetary gear set to said another rotating member are juxtaposed to the planetary gear set so that no rotating member need be arranged therearound. As a result, no restriction is exerted upon the size of the external diameters of those clutch means. Moreover, either a hydraulic servo mechanism for engaging the first clutch means or a hydraulic servo mechanism for engaging the second clutch means can be supported by a support member which is so mounted on the inner surface of the casing as to project toward the center. As a result, an oil passage leading to the hydraulic servo mechanism can be formed through that support member so that the oil supply passages can be simplified.

The above and further objects and features of the present invention will more appear from the following detailed description when the same is read in connection with the accompanying drawings. It is expressly understood, however, that the drawings are for the purpose of illustration only and are not intended to define the limits of the invention.

BRIEF DESCRIPTION OF THE DRAWINGS

FIGS. 2(A) and 2(B) are a sectional view showing another embodiment of the present invention, when jointed along line I—I, more specifically on the basis of the structure shown in FIG. 1.

DETAILED DESCRIPTION OF THE PREFERRED EMBODIMENTS

Figure 1:
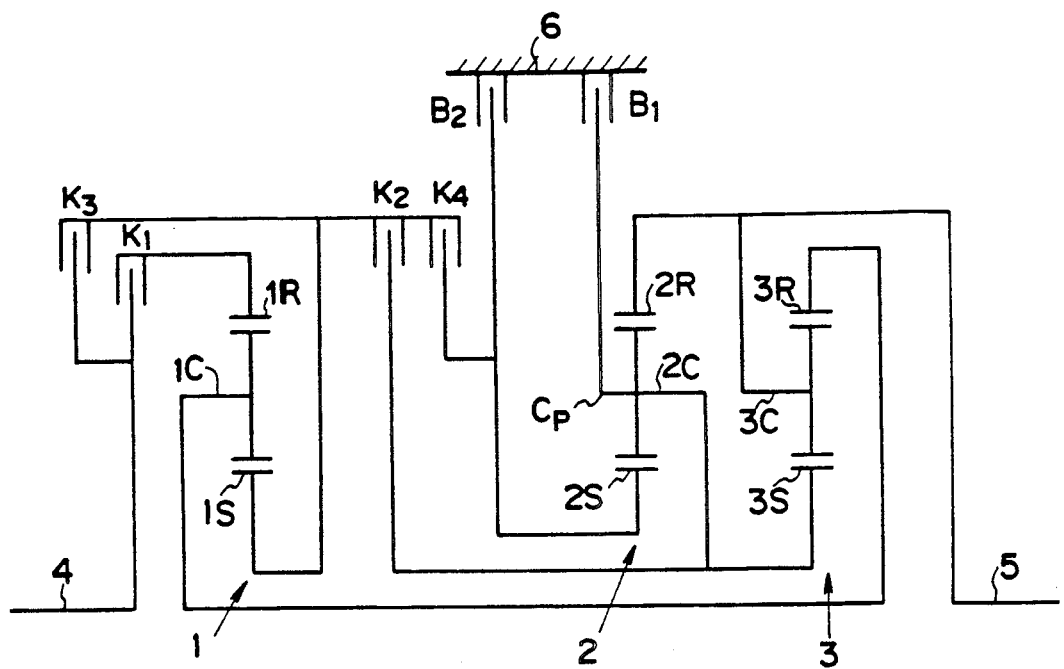
FIG. 1 is a skeleton diagram showing the principle of one embodiment of the present invention.

In FIG. 1, a gear train for setting five forward and one reverse gears is constructed of three planetary gear sets, i.e., front, center and rear planetary gear sets 1, 2 and 3 of single-pinion type. Here, the definitions of those front, center and rear are determined, assuming that an input shaft 4 is located at the front side, but are not always those determined from the mounted states on the vehicle, and their order of array do not follow their names. These planetary gear sets 1, 2 and 3 are respectively composed of sun gears 1S, 2S and 3S, ring gears 1R, 2R and 3R arranged coaxially of the sun gears, and carriers 1C, 2C and 3C for holding pinion gears meshing with those gears. The carrier 1C of the front planetary gear set 1 and the ring gear 3R of the rear planetary gear set 3 are integrally connected. The ring gear 2R of the center planetary gear set 2 and the carrier 3C of the rear planetary gear set 3 are integrally connected. Moreover, the carrier 2C of the center planetary gear set 2 and the sun gear 3S of the rear planetary gear set 3 are integrally connected. Moreover, the carrier 2C of the center planetary gear set 2 and the sun gear 3S of the rear planetary gear set 3 thus connected to each other are connected to the sun gear 1S of the front planetary gear set 1 through second clutch means K2. The sun gears 1S and 2S of the front planetary gear set 1 and the center planetary gear set 2 are connected to each other through fourth clutch means K4.

The input shaft 4 is disposed at the side of the front planetary gear set 1 and is selectively connected to the ring gear 1R of the front planetary gear set 1 through first clutch means K1. The input shaft 4 and the sun gear 1S of the front planetary gear set 1 are selectively connected through third clutch means K3. On the contrary, an output shaft 5 is disposed at the side of the rear planetary gear set 3 and is connected to the ring gear 2R of the center planetary gear set 2 and the carrier 3C of the rear planetary gear set 3, which in turn are connected to each other.

On the other hand, the brake means for blocking the rotations of predetermined members are exemplified by first and second brake means B1 and B2. Of these, the first brake means B1 is interposed between the carrier 2C of the center planetary gear set 2 and a transmission casing (which will be shortly referred to as the "casing") for blocking the rotations of that carrier 2C and the sun gear 3S of the rear planetary gear set 3, which are connected to each other. The second brake means B2 is interposed between the sun gear 2S of the center planetary gear set 2 and the casing 6 for blocking the rotations of that sun gear 2S.

The carrier 2C of the center planetary gear set 2 and the first brake means B1 are connected, as indicated at Cp, to each other at the front (or lefthand, as seen from FIG. 1) side of the center planetary gear set 2. That carrier 2C and the sun gear 3S of the rear planetary gear set 3 are connected at the rear side of the center planetary gear set 2. The second and fourth clutch means K2 and K4 are arranged closer to the connected portion Cp, at which the first brake means B1 is connected to the carrier 2C, than the center planetary gear set 2. Of the two clutch means K2 and K4, the fourth one K4 is arranged closer to the center planetary gear set 2 than is the second one K2. In the axial direction, moreover, the second brake means B2 is interposed between the fourth clutch means K4 and the first brake means B1.

Incidentally, the engagement means such as the aforementioned clutch means or brake means includes multi-disc clutches or brakes which are adapted to be engaged or released by hydraulic servo mechanisms used in the existing automatic transmission of the prior art. However, the engagement means should not be limited to the multi-disc members but can be suitably constructed by combining a one-way clutch with the multi-disc clutches or brakes. On the other hand, either the structure for connecting the components of the individual planetary gear sets or the structure for connecting the components of the individual planetary gear sets and the engagement means can be exemplified by connecting means such as the connecting drum or quill shaft which is adopted in the existing automatic transmission of the prior art.

The automatic transmission thus far described with reference to FIG. 1 can set five forward and one reverse gears, which can be individually established by engaging and/or releasing the aforementioned clutch means and brake means, as enumerated in Table 1. Here in Table 1, the symbol ○ indicates the engagements whereas the symbol × indicates the releases.

TABLE 1

|  | Clutch Means | | | | Brake Means | |
| --- | --- | --- | --- | --- | --- | --- |
|  | K1 | K2 | K3 | K4 | B1 | B2 |
| 1st | ○ | × | × | ○ | ○ | × |
| 2nd | ○ | ○ | × | × | ○ | × |
| 3rd | ○ | × | ○ | × | ○ | × |
| 4th | ○* | ○* | ○* | ○* | × | × |
| 5th | × | ○ | ○ | × | × | ○ |
| Rev | × | × | ○ | ○ | ○ | × |

*At least any three clutch means are engaged.

Figure 2B:
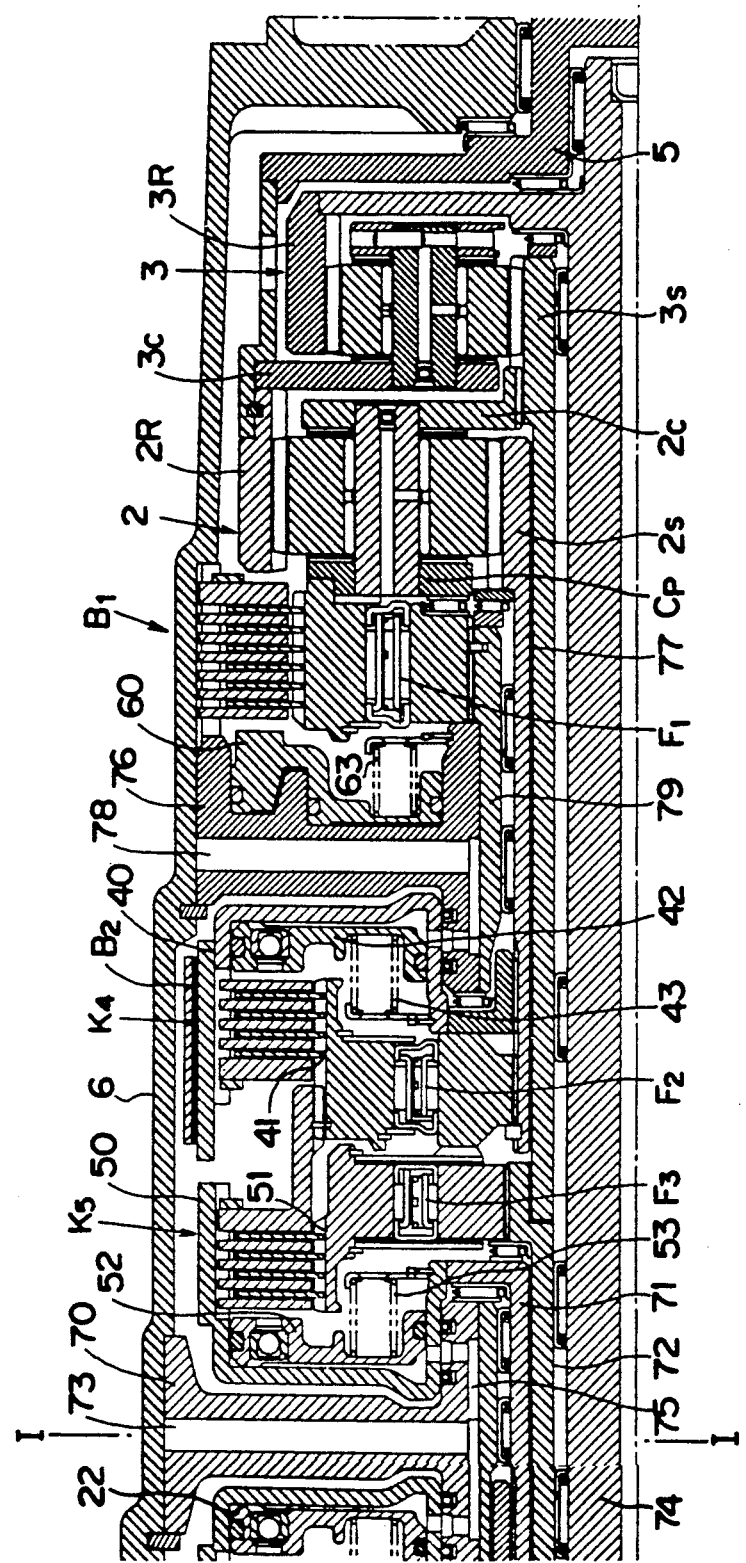

The specific structure of the automatic transmission shown in the skeleton diagram of FIG. 1 is shown in FIGS. 2(A) and 2(B). In the structure shown in FIGS. 2(A) and 2(B), another clutch means composed of a multi-disc clutch and a one-way clutch is arranged in parallel with the second clutch means K2, as will be sequentially described in the following. The input shaft 4 is connected to the output shaft (although not shown) of coupling means such as a torque converter and has its leading end connected to a clutch drum 10 of the first clutch means K1. This first clutch means K1 is engaged to transmit the torque by causing the discs and plates, which are splined to the clutch drum 10 and a clutch hub 11 integrated with the ring gear 1R of the front planetary gear set 1, to contact frictionally with each other and is released to transmit no torque by releasing the frictional contacts. For these engagements and releases, there is provided a hydraulic servo mechanism. This hydraulic servo mechanism is made to have a structure similar to that widely known in the prior art, in which a hydraulic piston 12 is arranged in the clutch drum 10 to move backward in the axial directions. A return spring 13 is arranged in front of the hydraulic piston 12 to move it backward. The third clutch means K3 for connecting the input shaft 4 and the sun gear 1S of the front planetary gear set 1 is also engaged, like the first clutch means K1, to transmit the torque by causing the discs and plates, which are splined to a clutch drum 30 and a clutch hub 31, to contact frictionally with each other and is released to transmit no torque by releasing the frictional contacts. The clutch hub 31 is integrated with the clutch drum 10 of the first clutch means K1, and the clutch drum 30 is integrally connected to a cylindrical connecting drum 34 which in turn is connected to the sun gear 1S of the front planetary gear set 1 while covering the first clutch means K1 and the outer surface of the front planetary gear set 1. This third clutch means K3 is engaged or released by the hydraulic servo mechanism, as will be described in the following. In the clutch drum 30, there is reciprocally fitted a hydraulic piston 32, and a return spring 33 disposed in front of the hydraulic piston 32.

At the opposite side of the first clutch means K1 across the front planetary gear set 1, there is arranged the second clutch means K2, which is supported by a quill shaft 71 fitted rotatably in the inner surface a first center support 70. Specifically, the first center support 70 is fixed on the inner surface of the casing 6. Moreover, the clutch drum 20 of the second clutch means K2 is fitted rotatably, while being held in liquid-tight state, in the boss of the first center support 70 and has its leading end engaging irrotatably with the aforementioned connecting drum 34. Moreover, the clutch drum 20 is splined to the quill shaft 71 which is rotatably supported on the inner surface of the first center support 70. A clutch hub 21, which is to be connected to the clutch drum 20 by the frictional contact of the discs and the plates, is connected to a first sun gear shaft 72 which is rotatably supported on the inner surface of the aforementioned quill shaft 71. The second clutch means K2 is engaged or released by a hydraulic servo mechanism. This hydraulic servo mechanism is constructed such that a hydraulic piston 22 is reciprocally movably fitted in the clutch drum 20 and such that a return spring 23 for moving the hydraulic piston 22 backward is disposed in front of the hydraulic piston 22. The feed and discharge of the oil pressure to and from the hydraulic servo mechanism are accomplished through an oil passage 73 which extends through the first center support 70 from its outer surface.

Radially internally of the aforementioned first sun gear 72, there is disposed an intermediate shaft 74 which is coaxial with the aforementioned input shaft 4. The intermediate shaft 74 extends from the front planetary gear set 1 to the rear end opposite to the input shaft 4 and has its front end connected to the carrier 1C of the aforementioned front planetary gear set 1 and its rear end connected to the ring gear 3R of the rear planetary gear set 3.

At the opposite side of the second clutch means K2 across the aforementioned first center support 70, there is arranged a fifth clutch means K5. This fifth clutch means K5 has its clutch drum 50 fitted rotatably, while being held in liquid-tight state, in the boss of the first center support 70 and connected to the aforementioned quill shaft 71. As a result, the clutch drums 20 and 50 of the second clutch means K2 and the fifth clutch means K5 are connected to each other. The fifth clutch means K5 has its disk and plate thrusted to contact frictionally with each other by means of a hydraulic piston 52, which is reciprocally movably fitted in the clutch drum 50, so that the torque may be transmitted between the clutch drum 50 and a clutch hub 51. This clutch hub 51 is integrated with the outer race of a one-way clutch F3, which in turn has its inner race connected to the aforementioned first sun gear shaft 72. In other words, the fifth clutch means K5 and the one-way clutch F3 are arrayed in series. Incidentally, the release of the fifth clutch means K5 is accomplished by moving the hydraulic piston 52 backward by a return spring 53. The feed and discharge of the oil pressure to and from the hydraulic piston 52 for actuating the fifth clutch means K5 are effected through another oil passage 75 which is formed to extend through the aforementioned first center support 70. In other words, the hydraulic piston 52 and the return spring 53 constitute together the hydraulic servo mechanism for engaging and releasing the fifth clutch means K5.

The fourth clutch means K4 opposes to the fifth clutch means K5. This fourth clutch means K4 is also composed, as its major components, like other clutch means, of a clutch drum 40, a clutch hub 41 connected to or released in a torque transmitting manner to the clutch drum 40 through discs and plates, a hydraulic piston 42 and a return spring 43. The clutch drum 40 is fitted rotatably, while being held in a liquid-tight state, in the boss of a second center support 76, which is fixed on the inner surface of the casing 6, and is connected to one end portion of a second sun gear shaft 77 which is rotatably arranged on the outer surface of the aforementioned first sun gear shaft 72. Moreover, the clutch hub 41 is integrated with the outer race of another one-way clutch F2, which in turn has its inner race splined to the second sun gear shaft 77. The oil pressure for actuating the hydraulic piston 42 is fed and discharged through an oil passage 78 which is formed to extend through the second center support 76. Incidentally, the other end of the second sun gear shaft 77 is connected to the sun gear 2S of the center planetary gear set 2. As a result, the hydraulic piston 42 and the return spring 43 constitute together the hydraulic servo mechanism for engaging and releasing the fourth clutch means K4.

Moreover, the clutch drum 40 of the fourth clutch means K4 acts as a brake drum and has its outer surface equipped with the second brake means B2 composed of a band brake.

At the opposite side of the fourth clutch means K4 across the second center support 76, there are arranged the first brake means B1 and a one-way clutch F1. The first brake means B1 is made of a multi-disc brake which has its discs splined to the leading end of the second center support 76 and its plates splined to the outer surface of the outer race of the one-way clutch F1. This one-way clutch F1 has its inner race splined to a sleeve 79 which is integrated with the second center support 76. Moreover, the carrier 2C of the center planetary gear set 2 is connected to the outer race of the one-way clutch F1. As a result, the first brake means B1 and the one-way clutch F1 are in parallel relationship with each other so that they block the rotations of the carrier 2C of the center planetary gear set 2 selectively. The first brake means B1 is engaged and released by a hydraulic servo mechanism. Specifically, there is fitted in the second center support 76 a hydraulic piston 60, to and from which the oil is fed and discharged through another oil passage (although not shown) formed to extend through the second center support 76 from the outer surface thereof. Moreover, a return spring 63 for moving the hydraulic piston 60 backward is arranged in front of the hydraulic piston 60.

On the other hand, the center planetary gear set 2 and the rear planetary gear set 3 are arranged subsequent to the first brake means B1 and the one-way clutch F1. The center planetary gear set 2 has its carrier 2C connected and splined to the first sun gear shaft 72 and its ring gear 2R connected to the carrier 3C of the rear planetary gear set 3. These ring gear 2R and carrier 3C are connected to the output shaft 5 which is arranged on the extension of the aforementioned intermediate shaft 74.

Even the automatic transmission shown in FIGS. 2(A) and 2(B) can also set the five forward and one reverse gears, as enumerated in Table 2. In this Table: symbol ⊙ indicates the engaged state during an engine braking; symbol Δ indicates the permission of engagement; and the residuals are similar to those of Table 1.

TABLE 2

|  | Clutch Means | | | | | Brake | | One-Way Clutch | | |
| --- | --- | --- | --- | --- | --- | --- | --- | --- | --- | --- |
|  | K1 | K2 | K3 | K4 | K5 | B1 | B2 | F1 | F2 | F3 |
| 1st | O | X | X | ⊙ | X | ⊙ | X | O | O | X |
| 2nd | O | ⊙ | X | X | O | ⊙ | X | O | X | O |
| 3rd | O | X | O | X | Δ | ⊙ | X | O | X | X |
| 4th | Δ | ⊙ | O | ⊙ | O | X | X | X | O | O |
| 5th | X | ⊙ | O | X | O | X | O | X | X | O |
| Rev | X | X | O | O | Δ | O | X | Δ | Δ | X |

As is now apparent from FIGS. 2(A) and 2(B), therefore, the second clutch means K2 and the fourth clutch means K4 are disposed at the same side as is the connected portion Cp, by which the first brake means B1 is connected to the carrier 2C, with respect to the center planetary gear set 2, and the fourth clutch means K4 is disposed closer to the center planetary gear set 2 than is the second clutch means K2, so that no rotating member exists radially outside of those clutch means K2 and K4. That is, each of the clutches K2 and K4 has a portion, i.e., the clutch drums 20 and 40, respectively, which is the radially outermost rotating part of the gear train at the axial position of the transmission in which the respective clutch is positioned. As a result, the clutch means K2 and K4 have their external diameters retained at the necessary values without being especially restricted while their axial lengths shortened. Moreover, the feed and discharge of the oil pressure to the hydraulic servo mechanisms for actuating those clutch means K2 and K4 can be accomplished from the outside of their outer surfaces so that the oil passage structures can be simplified. Since, moreover, the external diameters of the clutch means K2 and K4 are not restricted but can be equalized to share the parts for the clutch means such as the clutch drums and discs and the accompanying hydraulic servo mechanisms.

Incidentally, the present invention should not be limited to the embodiments thus far described but can be engaged to an automatic transmission which is equipped with another gear train constructed of three planetary gear sets, as will be exemplified in the following.

Figure 3:
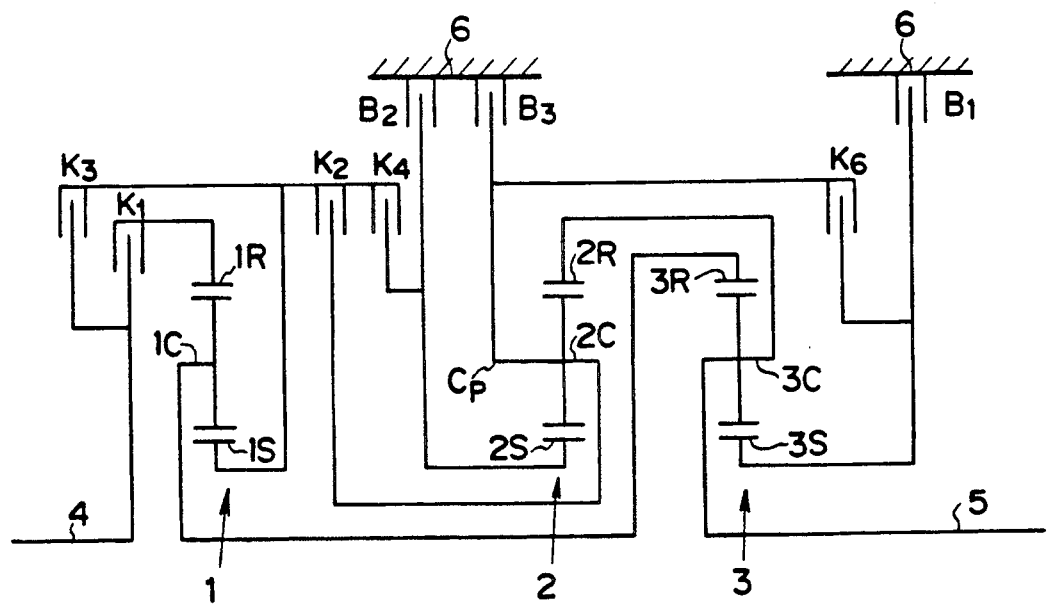
FIGS. 3 to 20 are skeleton diagrams showing the principles of other embodiments of the present invention.

The embodiment shown in FIG. 3 is constructed such that the brake means for braking the carrier 2C of the center planetary gear set 2 of the structure of FIG. 1 selectively is exemplified by third brake means B3, such that the first brake means B1 brakes the sun gear 3S of the rear planetary gear set 3 by itself, and such that sixth clutch means K6 is interposed between the carrier 2C of the center planetary gear set 2 and the sun gear 3S of the rear planetary gear set 3. The second clutch means K2 and the fourth clutch means K4 arranged at the same side as the connected portion Cp, at which the third brake means B3 for braking the carrier 2C of the center planetary gear set 2 selectively is connected to the carrier 2C, and the fourth clutch means K4 is arranged at the side of the center planetary gear set 2 with respect to the second clutch means K2, so that the advantages obtainable are similar to those of the aforementioned ones. With this structure, moreover, the carrier 2C of the center planetary gear set 2 can be prevented from any unnecessary rotation. Table 3 enumerates the operations of the automatic transmission having the structure shown in FIG. 3.

TABLE 3

| | Clutch Means | | | | Brake Means | | |
|---|---|---|---|---|---|---|---|
| | K1 | K2 | K3 | K4 | K6 | B1 | B2 | B3 |
| 1st | ○ | X | X | ○ | X* | ○* | X | ○* |
| 2nd | ○ | X* | X | ○* | X* | ○ | ○* | X |
| 3rd | ○ | X* | ○ | ○* | X* | ○* | X* | X* |
| 4th | ○* | ○* | ○* | ○* | ○* | X | X* | X* |
| 5th | X* | ○ | ○ | X | ○* | X* | ○ | X* |
| Rev | X | X | ○ | ○ | X* | ○* | X | ○* |

*The engaged and released states of those clutch means and brake means should not be limited to those, as tabulated, but the corresponding gears can be set by another combination.

Figure 4:
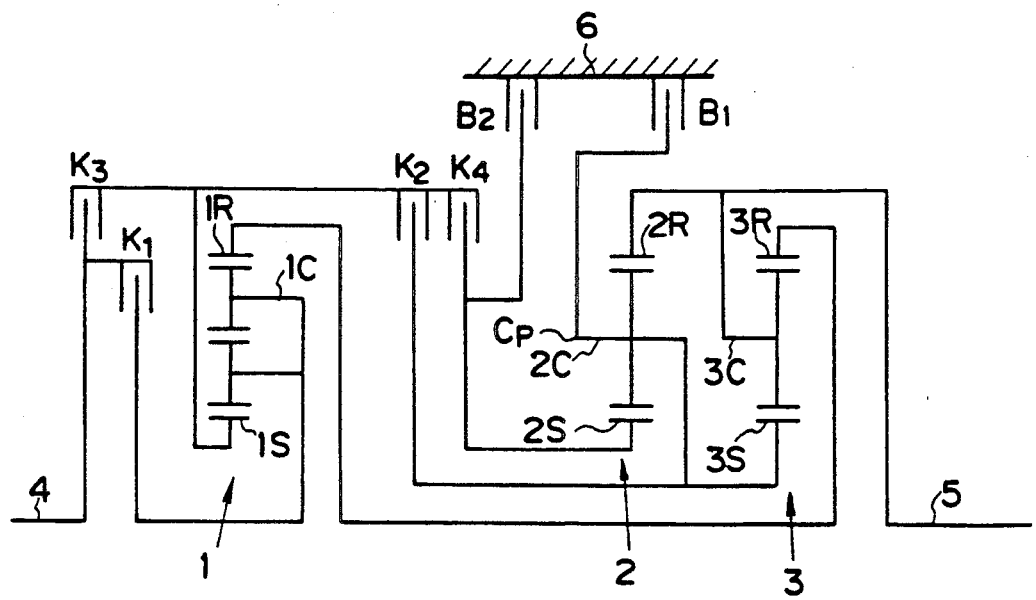

The automatic transmission shown in FIG. 4 is constructed such that the front planetary gear set 1 of the structure of FIG. 1 is replaced by a double-pinion type planetary gear set so that the front planetary gear set 1 has its ring gear 1R integrally connected to the ring gear 3R of the rear planetary gear set 3 and its sun gear 1S connected selectively to the input shaft 4 by the third clutch means K3. Moreover, the first brake means B1 is arranged closer to the rear planetary gear set 3 than the center planetary gear set 2 while its connected portion Cp to the carrier 2C being left at the side of the front planetary gear set 1 with respect to the center planetary gear set 2. The remaining structural components are similar to those of the embodiment shown in FIG. 1. The operations of the automatic transmission shown in FIG. 4 are enumerated in Table 4.

TABLE 4

| | Clutch Means | | | | Brake Means | |
|---|---|---|---|---|---|---|
| | K1 | K2 | K3 | K4 | B1 | B2 |
| 1st | ○ | X | X | ○ | ○ | X |
| 2nd | ○ | ○ | X | X | ○ | X |
| 3rd | ○ | X | ○ | X | ○ | X |
| 4th | ○* | ○* | ○* | ○* | X | X |
| 5th | X | ○ | ○ | X | X | ○ |
| Rev | X | X | ○ | ○ | ○ | X |

*At least any three clutch means are engaged.

Figure 5:
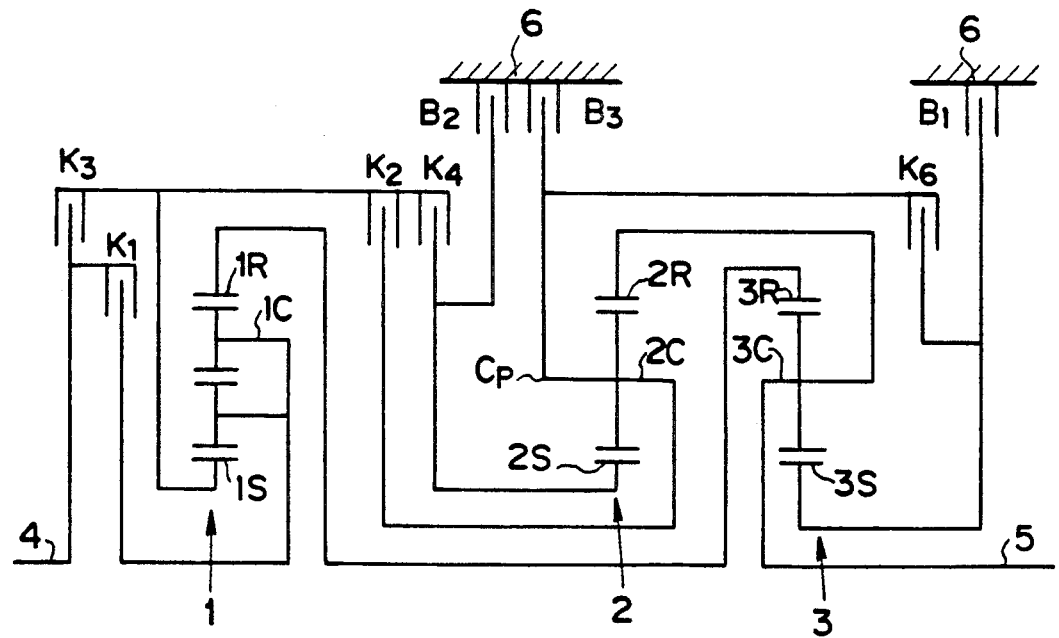

On the other hand, the automatic transmission shown in FIG. 5 is constructed such that the front planetary gear set 1 having the structure of FIG. 3 is replaced by a double-pinion type planetary gear set so that the front planetary gear set 1 has its ring gear 1R integrally connected to the ring gear 3R of the front planetary gear set 3 and its sun gear 1S connected selectively to the input shaft by the third clutch means K3. The remaining structural components are similar to those of the embodiment of FIG. 3. The operations of the automatic transmission shown in FIG. 5 are enumerated in Table 5.

TABLE 5

| | Clutch Means | | | | | Brake Means | | |
|---|---|---|---|---|---|---|---|---|
| | K1 | K2 | K3 | K4 | K6 | B1 | B2 | B3 |
| 1st | ○ | X | X | ○ | X* | ○* | X | ○* |
| 2nd | ○ | X* | X | ○* | X* | ○ | ○* | X |
| 3rd | ○ | X* | ○ | ○* | X* | ○* | X* | X* |
| 4th | ○* | ○* | ○* | ○* | ○* | X | X* | X* |
| 5th | X* | ○ | ○ | X | ○* | X* | ○ | X* |
| Rev | X | X | ○ | ○ | X* | ○ | X* | ○* |

*The engaged and released states of those clutch means and brake means should not be limited to those, as tabulated, but the corresponding gears can be set by another combination.

Figure 6:
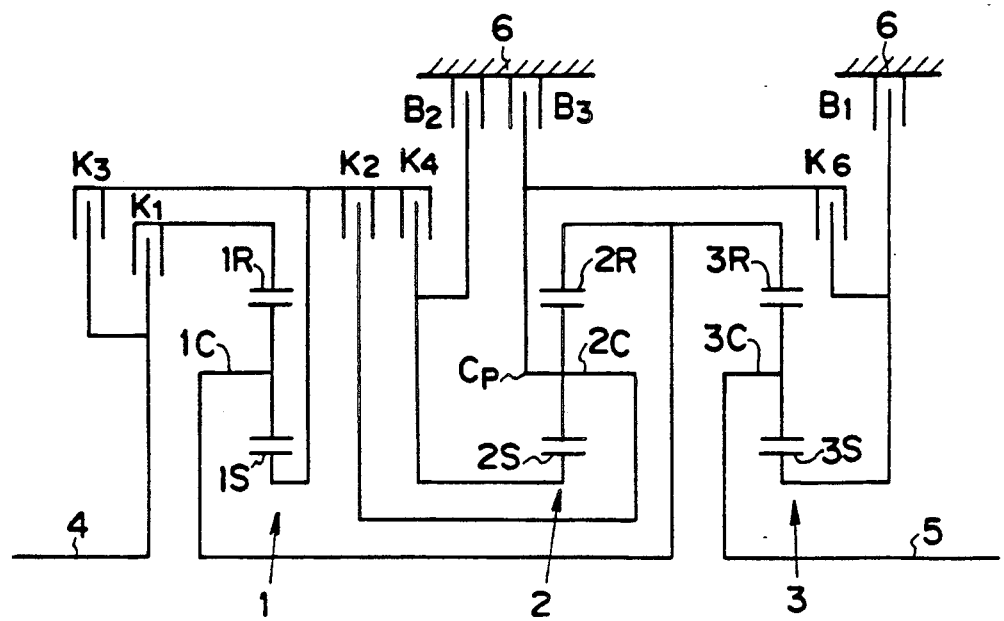

Another embodiment shown in FIG. 6 is modified from the foregoing structure of FIG. 3 is modified in the connection between the components of the center planetary gear set 2 and the components of the rear planetary gear set 3. Specifically, the ring gear 2R of the center planetary gear set 2 and the ring gear 3R of the rear planetary gear set 3 are integrally connected so that the carrier 1C of the front planetary gear set 1 is always connected to those ring gears 2R and 3R. The remaining structural components are similar to those shown in FIG. 3. The operations are enumerated in FIG. 6.

TABLE 6

| | Clutch Means | | | | | Brake Means | | |
|---|---|---|---|---|---|---|---|---|
| | K1 | K2 | K3 | K4 | K6 | B1 | B2 | B3 |
| 1st | ○ | X | X | ○ | ○* | ○* | X | ○* |
| 2nd | ○ | X*1 | X | ○*1 | X*1 | ○*1 | ○*1 | X*1 |
| 3rd | ○ | X*1 | ○ | ○*1 | X*1 | ○ | X*1 | X*1 |
| 4th | ○*2 | ○*2 | ○*2 | ○*2 | ○*2 | X | X | X |
| 5th | X | ○ | ○ | X | ○ | X | ○ | X |
| Rev | X | X | ○ | ○ | X* | ○* | X | ○* |

*At least two may be engaged.
*1The engaged and released states of those clutch means and brake means should not be limited to those, as tabulated, but the corresponding gears can be set by another combination.
*2Either at least three of K1 to K3 or at least four of K1 to K6 may be engaged. In the case of the change between 3rd and 4th gears, K2 is released whereas K4 is engaged. In the case of the change between 4th and 5th gears, K2 is engaged whereas K4 is released.

Figure 7:
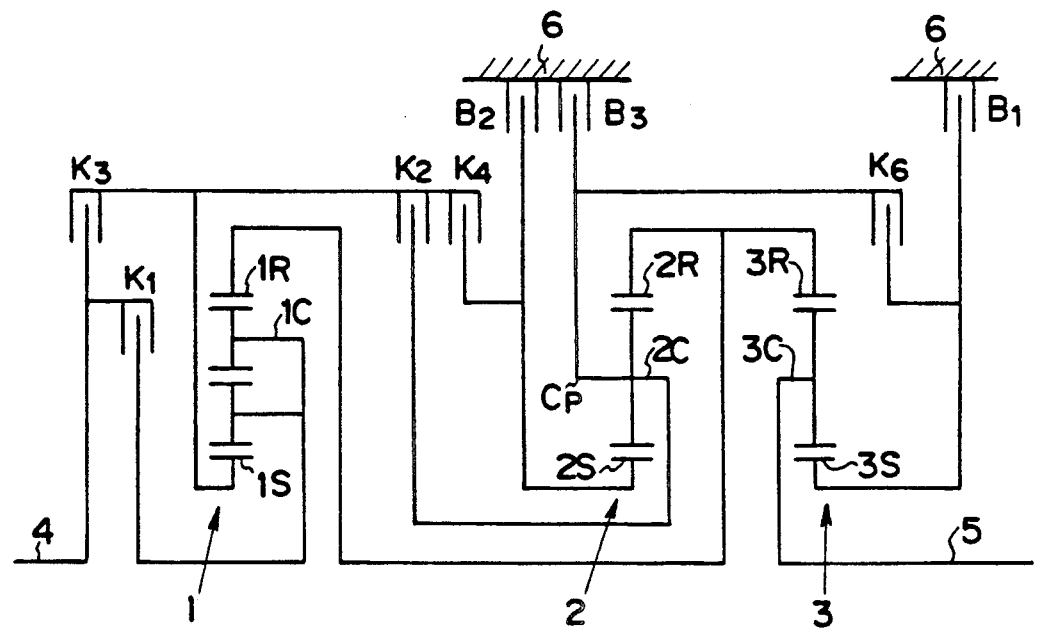

Another embodiment shown in FIG. 7 is made by modifying the structure of FIG. 5 as in the case of the structure of FIG. 6 coming from that of FIG. 3. In the structure shown in FIG. 7, the ring gears 2R and 3R of the center and rear planetary gear sets 2 and 3 of the structure of FIG. 5 are connected to each other so that the ring gear 1R of the front planetary gear set 1 is integrally connected to those two ring gears 2R and 3R. The operations are enumerated in Table 7.

TABLE 7

| | Clutch Means | | | | | Brake Means | | |
|---|---|---|---|---|---|---|---|---|
| | K1 | K2 | K3 | K4 | K6 | B1 | B2 | B3 |
| 1st | ○ | X | X | ○ | X* | ○* | X | ○* |
| 2nd | ○ | X* | X | ○* | X* | ○* | ○* | X* |
| 3rd | ○ | X* | ○ | ○* | X* | ○ | X* | X* |
| 4th | ○* | ○* | ○* | ○* | ○* | X | X | X |
| 5th | X | ○ | ○ | X | ○ | X | ○ | X |
| Rev | X | X | ○ | ○ | X* | ○* | X | ○* |

*The engaged and released states of those clutch means and brake means should not be limited to those, as tabulated, but the corresponding gears can be set by another combination.

Figure 8:
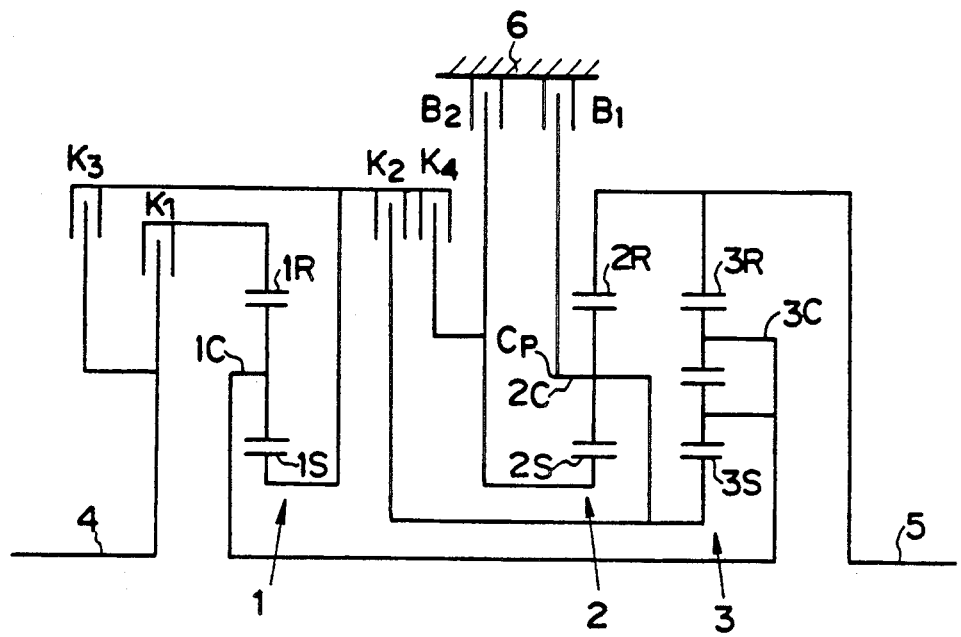

Another embodiment shown in FIG. 8 is modified from the foregoing structure of FIG. 1 such that the rear planetary gear set 3 is changed from the single-pinion type to a double-pinion type so that the carrier 1C of the front planetary gear set 1 is connected to the carrier 3C of the rear planetary gear set 3, and such that the ring gear 2R of the center planetary gear set 2 and the ring gear 3R of the rear planetary gear set 3 are connected to each other and to the output shaft 5. The remaining structural components are similar to those of FIG. 1. This structure can also set the five forward and one reverse gears and has the same operations as those of Table 1.

Figure 9:
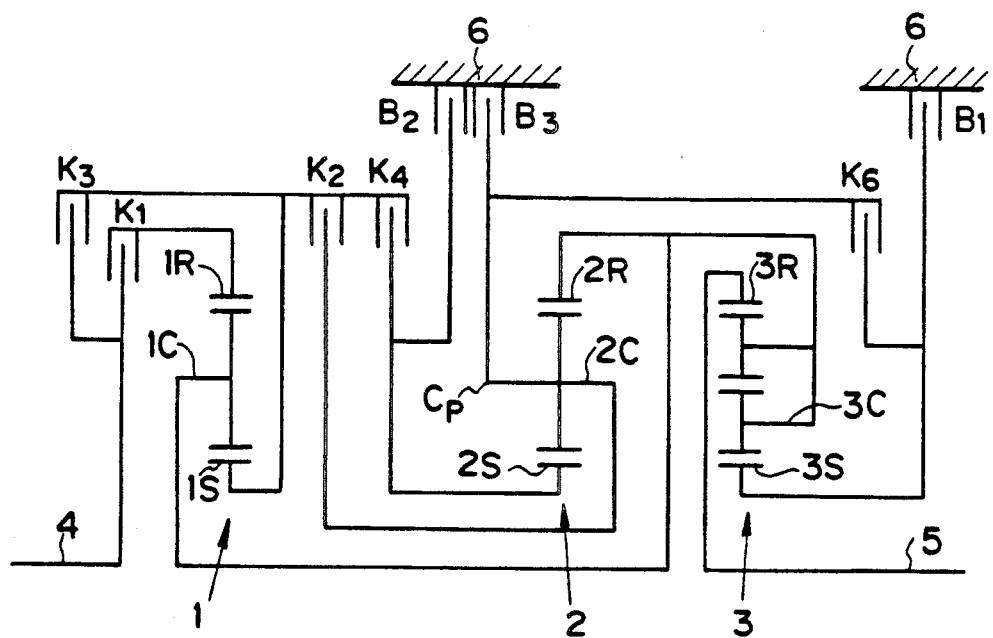

Another embodiment shown in FIG. 9 is modified from the foregoing structure of FIG. 3 such that the rear planetary gear set 3 is changed from the single-pinion type to a double-pinion type so that the carrier 1C of the front planetary gear set 1 is integrally connected to the ring gear 2R of the center planetary gear set 2 and the carrier 3C of the rear planetary gear set 3, which in turn are connected to each other, and such that the output shaft 5 is connected to the ring gear 3R of the rear planetary gear set 3. The remaining structural components are similar to those of the embodiment shown in FIG. 3. The operations are similar to those enumerated in Table 6.

In the embodiments thus far described with reference to FIGS. 3 to 9, too, the second clutch means K2 and the fourth clutch means K4 are arranged at the same side as is the connected portion Cp, by which the brake means B1 or B3 is connected to the carrier 2C of the center planetary gear set 2, and the fourth clutch means K4 connected to the sun gear 2S is arranged at the side closer to the center planetary gear set 2 than the second clutch means K2 connected to the carrier 2C. As a result, the external diameters of those clutch means K2 and K4 are not especially restricted, but the advantages obtainable can be similar to those of the automatic transmission shown in FIG. 1 and FIGS. 2(A) and 2(B).

Figure 10:
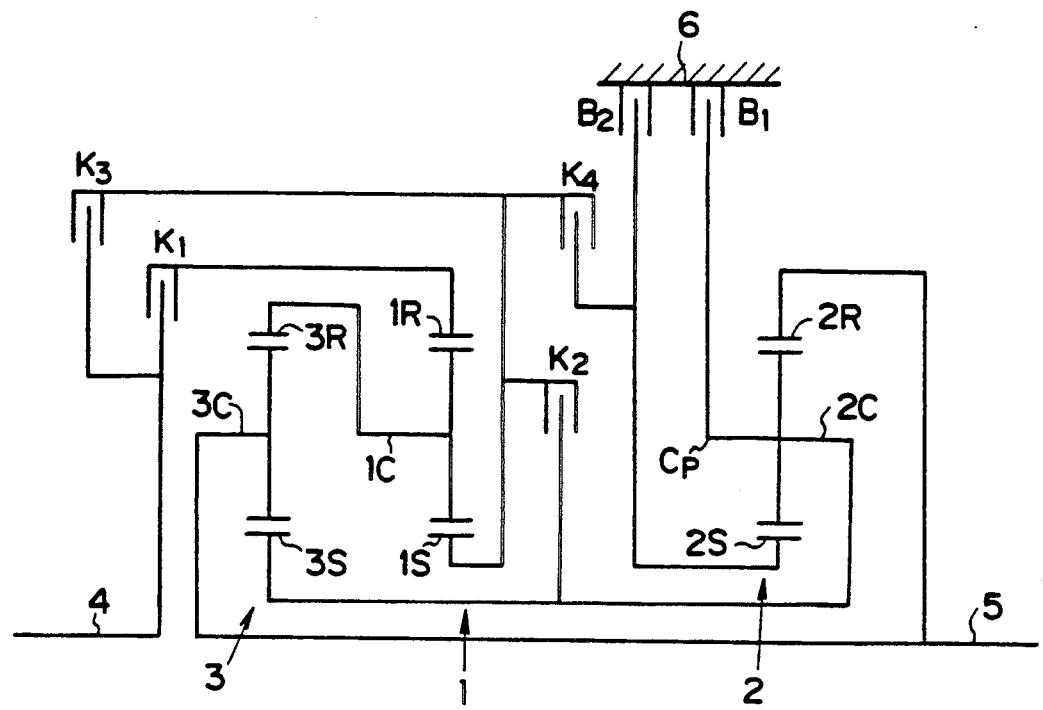

Another example shown in FIG. 10 is different from that of FIG. 1 in the arrangement of the three planetary gear sets 1, 2 and 3. Specifically, the front planetary gear set 1 and the center planetary gear set 2 are juxtaposed to each other across the second clutch means K2 and the fourth clutch means K4. The rear planetary gear set 3 is arranged at the opposite side (i.e., lefthand side, as shown in FIG. 10) to the center planetary gear set 2 across the front planetary gear set 1. The connection relations of the individual components of the planetary gear sets 1, 2 and 3 are identical to those of the embodiment shown in FIG. 1.

Figure 11:
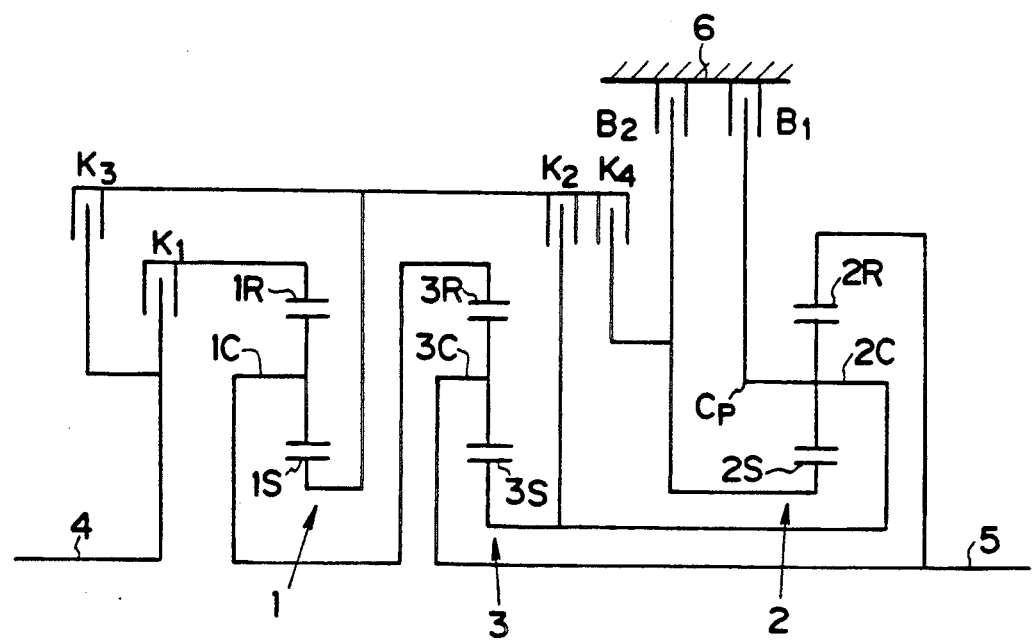

In another embodiment shown in FIG. 11, the rear planetary gear set 3 and the front planetary gear set 1 of FIG. 10 are arranged in the interchanged positions without changing the connection relations of the individual components of the planetary gear sets 1, 2 and 3.

Figure 12:
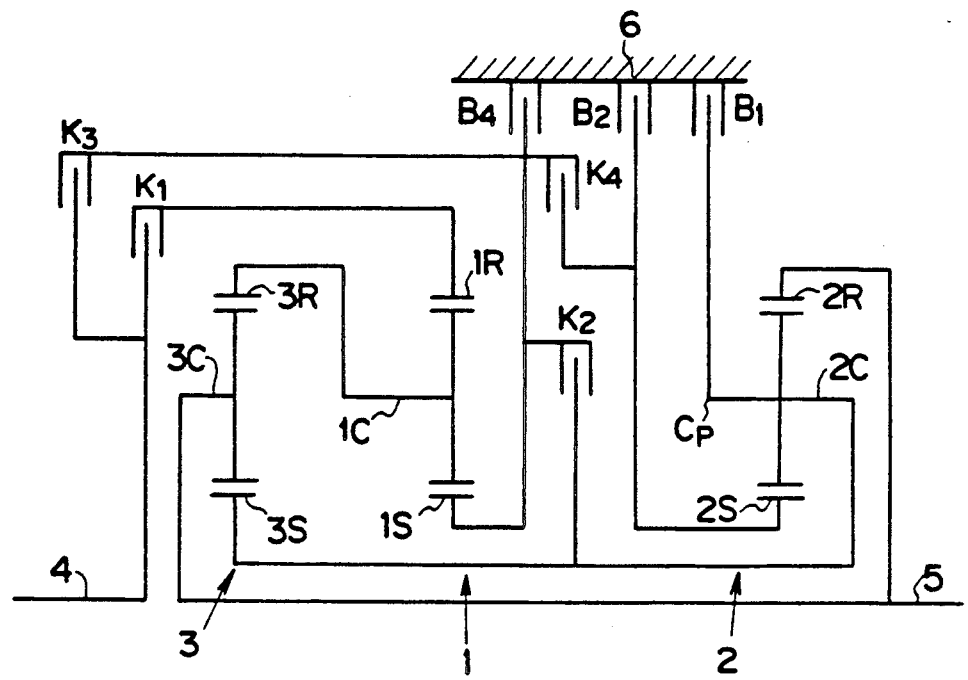

An automatic transmission shown in FIG. 12 is equipped with another brake means B4 for braking the sun gear 1S of the front planetary gear set 1 of the aforementioned structure of FIG. 10 with respect to the casing 6. The operations of the automatic transmission of FIG. 12 for setting the five forward and one reverse gears are enumerated in Table 8.

TABLE 8

| | Clutch Means | | | | Brake Means | | |
|---|---|---|---|---|---|---|---|
| | K1 | K2 | K3 | K4 | B1 | B2 | B4 |
| 1st | O | X | X | O | O | X | X |
| 2nd | O | X* | X | X | O* | X | O* |
| 3rd | O | X | O | X | O | X | X |
| 4th | O*1 | O*1 | O*1 | O*1 | X | X | X |
| 5th | X | O | O | X | X | O | X |
| Rev | X | X | O | O | O | X | X |

*At least two may be engaged.
*1At least three may be engaged.

Figure 13:
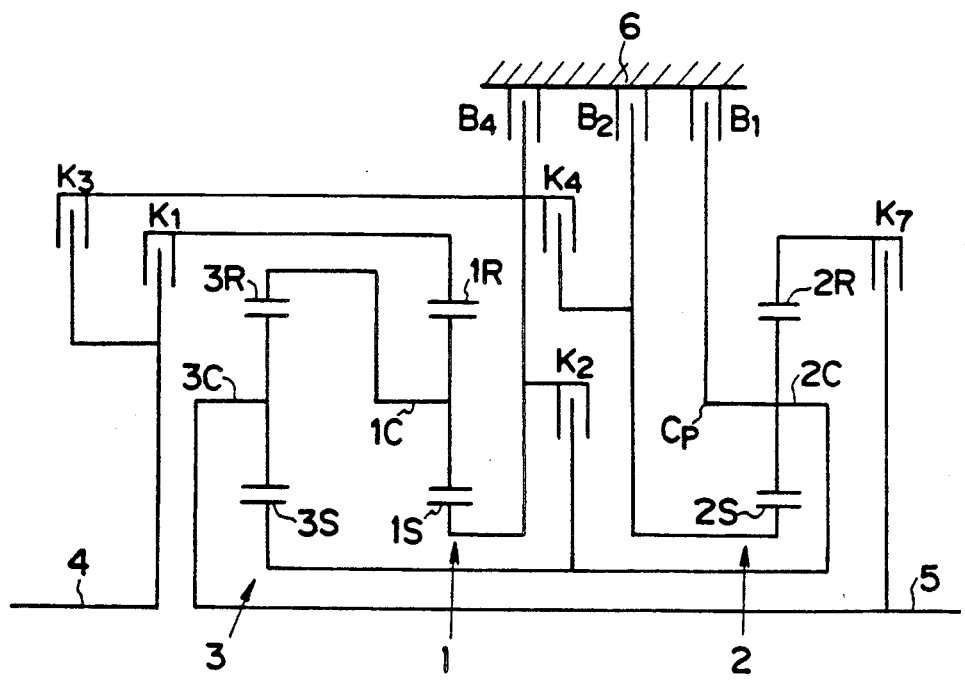

Another embodiment shown in FIG. 13 is equipped with seventh clutch means K7 interposed between the ring gear 2R of the center planetary gear set 2 and the output shaft 5 of the structure of FIG. 12 for connecting the two selectively. The operations are enumerated in Table 9.

TABLE 9

| | Clutch Means | | | | | Brake Means | | |
|---|---|---|---|---|---|---|---|---|
| | K1 | K2 | K3 | K4 | K7 | B1 | B2 | B4 |
| 1st | O | X | X | O | O | O | X | X |
| 2nd | O | X* | X | O* | X* | O* | X* | O* |
| 3rd | O | X | O | O*1 | X*1 | O | X | X |
| 4th | O*2 | O*2 | O*2 | O*2 | O*2 | X | X | X |
| 5th | X | O | O | X | O | X | O | X |
| Rev | X | X | O | O | O | O | X | X |

*The engaged and released states of those clutch means and brake means should not be limited to those, as tabulated, but may be combined in another manner.
*1Either one may be engaged.
*2Either at least three of K1 to K3 or at least four of K1 to K7 may be engaged. In the case of the change between 3rd and 4th gears, K2 is released whereas K4 is engaged. In the case of the change between 4th and 5th gears, K2 is engaged whereas K4 is released.

Figure 14:
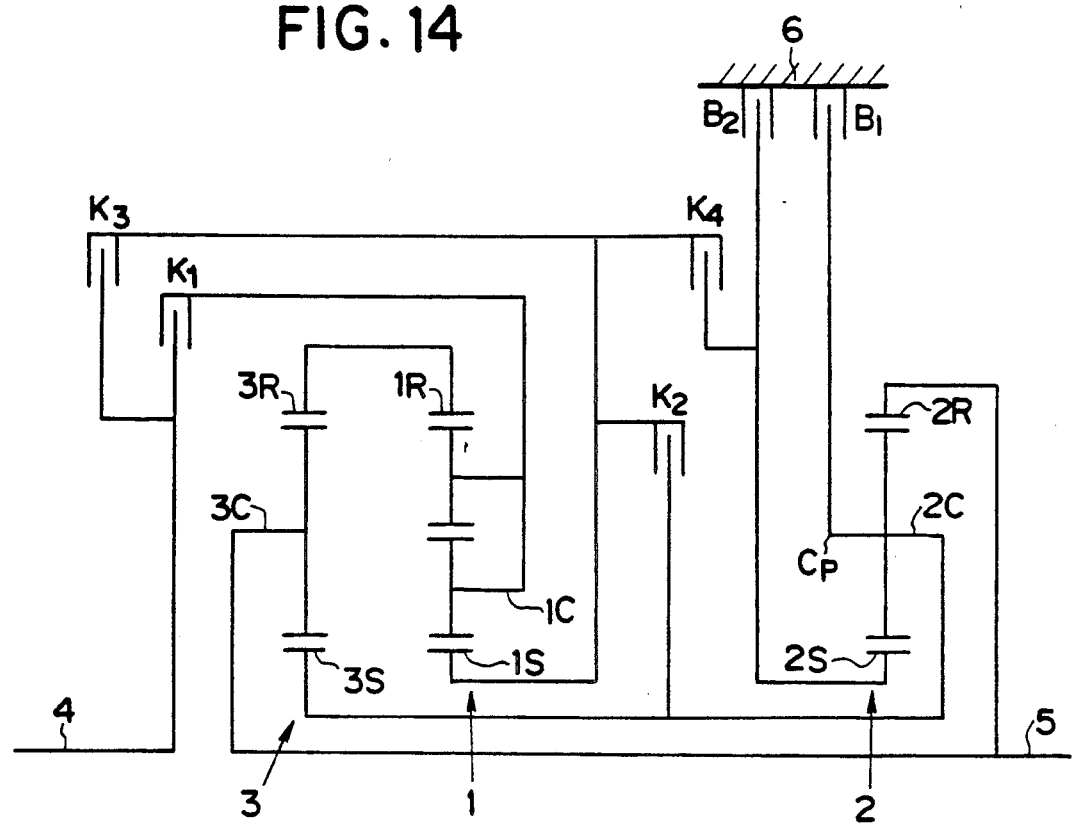

In another embodiment shown in FIG. 14, the order of array of the aforementioned individual planetary gear sets 1, 2 and 3 of FIG. 4 is modified. Specifically, the front planetary gear set 1 and the center planetary gear set 2 are juxtaposed to each other across the second clutch means K2 and the fourth clutch means K4. Moreover, the rear planetary gear set 3 is arranged at the opposite side to the center planetary gear set 2 across the front planetary gear set 1. Incidentally, the connection relations of the individual components of the planetary gear sets 1, 2 and 3 are identical to those of the components shown in FIG. 4.

Figure 15:
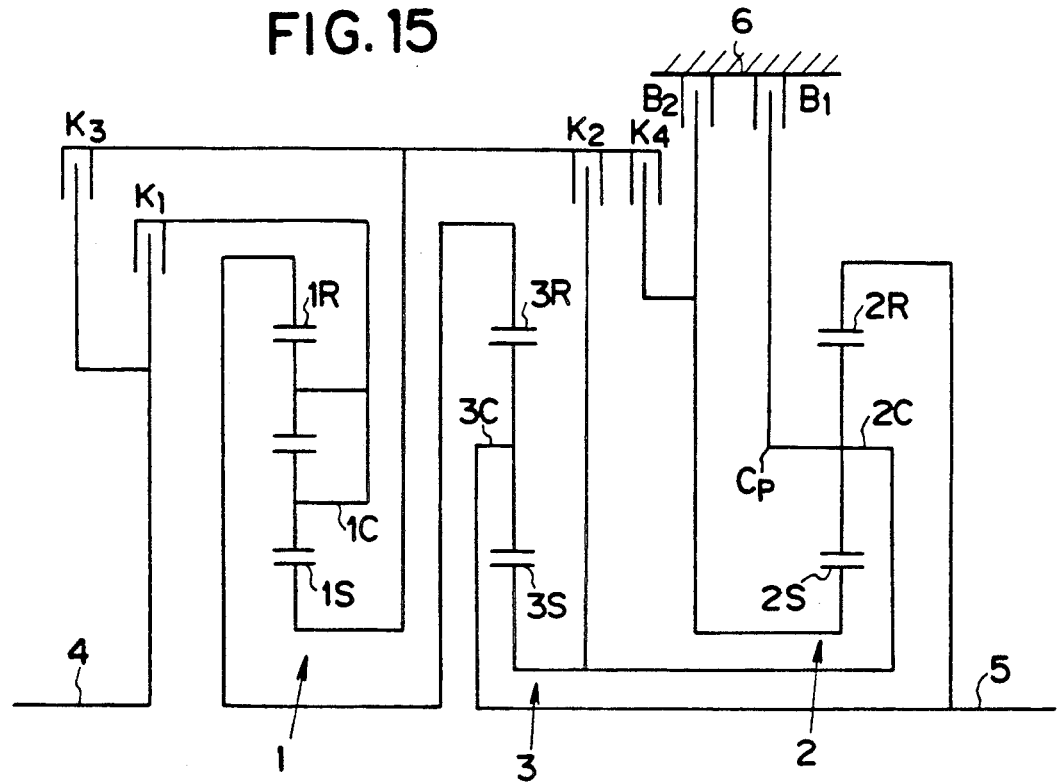

Another embodiment shown in FIG. 15 is modified from that of FIG. 14 such that the rear planetary gear set 3 and the front planetary gear set 1 have their positions interchanged.

Figure 16:
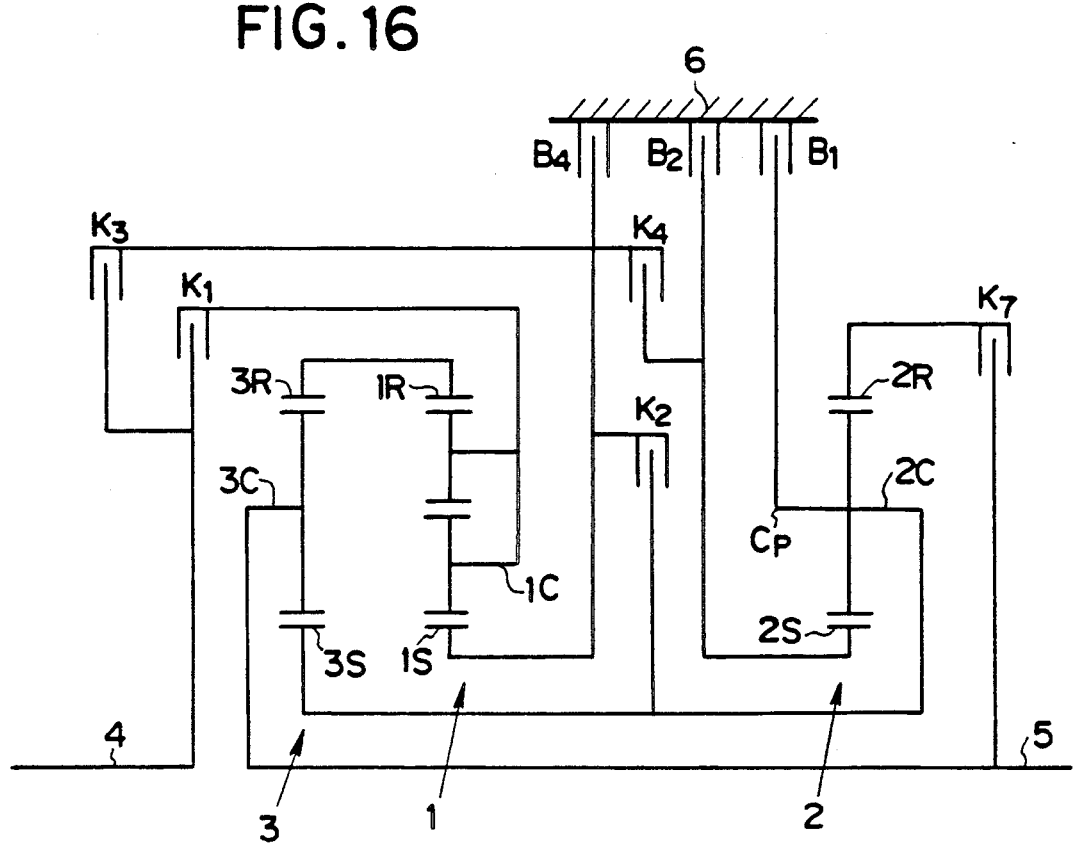

In another embodiment shown in FIG. 16, there is added to the aforementioned structure of FIG. 14 the seventh clutch means K7 for connecting the fourth brake means B4 for braking the sun gear 1S of the front planetary gear set 1 to the casing 6, the ring gear 2R of the center planetary gear set 2 and the output shaft 5 selectively. The operations are enumerated in Table 10.

TABLE 10

| | Clutch Means | | | | | Brake Means | | |
|---|---|---|---|---|---|---|---|---|
| | K1 | K2 | K3 | K4 | K7 | B1 | B2 | B4 |
| 1st | O | X | X | O | O | O | X | X |
| 2nd | O | X* | X | O* | X* | O* | X* | O* |
| 3rd | O | X | O | O*1 | X*1 | O | X | X |
| 4th | O*2 | O*2 | O*2 | O*2 | O*2 | X | X | X |
| 5th | X | O | O | X | O | X | O | X |
| Rev | X | X | O | O | O | O | X | X |

*The engaged and released states of those clutch means and brake means should not be limited to those, as tabulated, but may be combined in another manner.
*1Either one may be engaged.
*2Either at least three of K1 to K3 or at least four of K1 to K7 may be engaged. In the case of the change between 3rd and 4th gears, K2 is released whereas K4 is engaged. In the case of the change between 4th and 5th gears, K2 is engaged whereas K4 is released.

Figure 17:
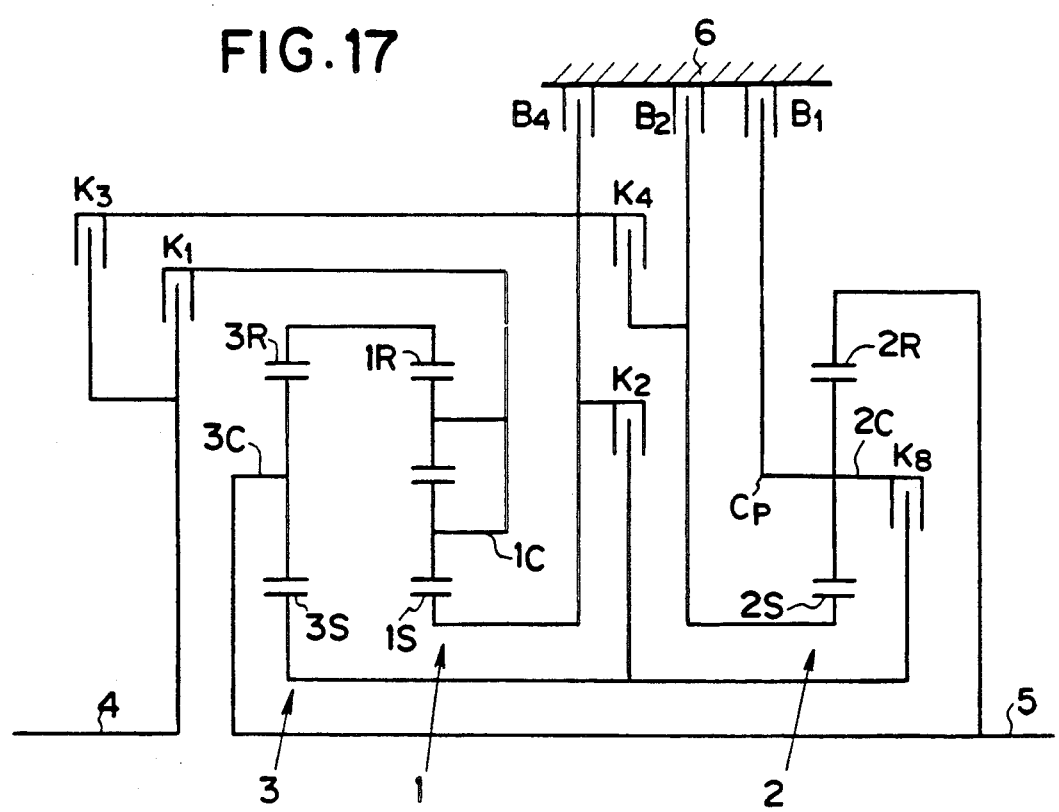

In another embodiment shown in FIG. 17, there is added to the aforementioned structure of FIG. 14 eighth clutch means K8 for connecting selectively the fourth brake means B4 for braking the sun gear 1S of the front planetary gear set 1 to the casing 6, the carrier 2C of the center planetary gear set 2 and the sun gear 3S of the rear planetary gear set 3. The operations are enumerated in Table 11.

TABLE 11

| | Clutch Means | | | | | Brake Means | | |
|---|---|---|---|---|---|---|---|---|
| | K1 | K2 | K3 | K4 | K8 | B1 | B2 | B4 |
| 1st | O | X | X | O | O | O | X | X |
| 2nd | O | X* | X | O* | X* | O* | X* | O* |
| 3rd | O | X | O | O*1 | X*1 | O | X | O |
| 4th | O*2 | O*2 | O*2 | O*2 | O*2 | X | X | X |
| 5th | X | O | O | X | O | X | O | X |
| Rev | X | X | O | O | O | O | X | X |

*The engaged and released states of those clutch means and brake means should not be limited to those, as tabulated, but may be combined in another manner.
*1Either one may be engaged.
*2Either at least three of K1 ot K3 or at least four of K1 to K8 may be engaged. In the case of the change between 3rd and 4th gears, K2 is released whereas K4 is engaged. In the case of the change between 4th and 5th gears, K2 is engaged whereas K4 is released.

Figure 18:
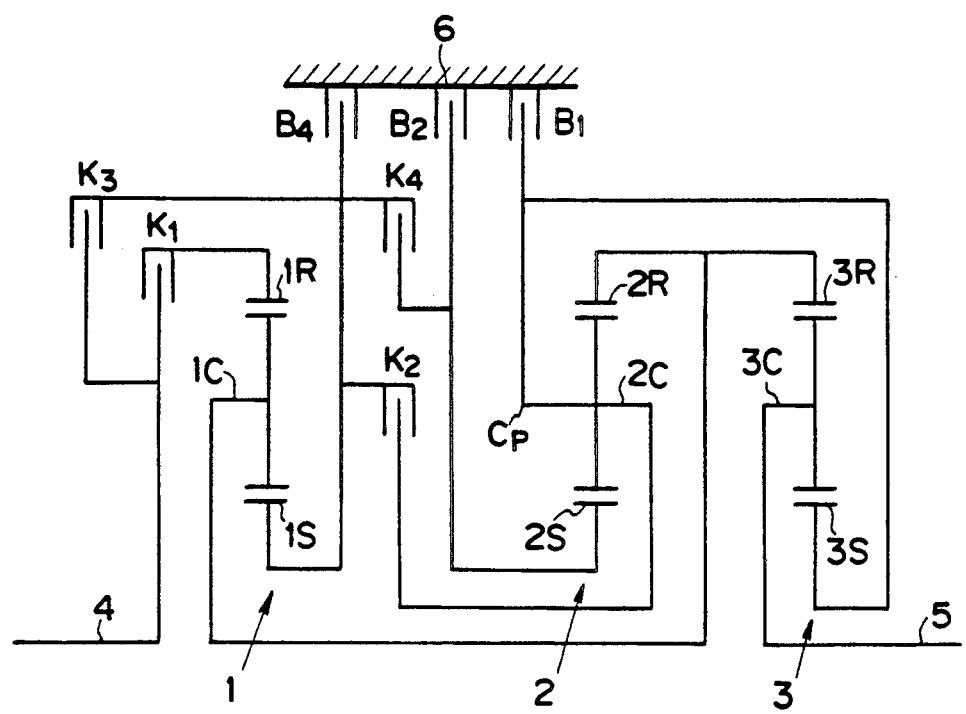

Another embodiment shown in FIG. 18 is modified from the aforementioned structure of FIG. 6 such that the carrier 2C of the center planetary gear set 2 is integrally connected to the sun gear 3S of the rear planetary gear set 3, such that there is provided the first brake means B1 for braking those carrier 2C and sun gear 3S to the casing 6, and such that there is provided the fourth brake means B4 for braking the sun gear 1S of the front planetary gear set 1 to the casing 6. The remaining structural components are similar to those of FIG. 6. The operations are enumerated in Table 12.

TABLE 12

| | Clutch Means | | | | Brake Means | |
|---|---|---|---|---|---|---|
| | K1 | K2 | K3 | K4 | B1 | B4 | B2 |
| 1st | O | X | X | O | O | X | X |
| 2nd | O | X* | X | O | O* | O* | X |
| 3rd | O | X | O | X | O | X | X |
| 4th | O*1 | O*1 | O*1 | O*1 | X | X | X |
| 5th | X | O | O | X | X | X | O |
| Rev | X | X | O | O | O | X | X |

*At least any two clutch means and brake means are engaged.
*1At least any three clutch means are applied.

Figure 19:
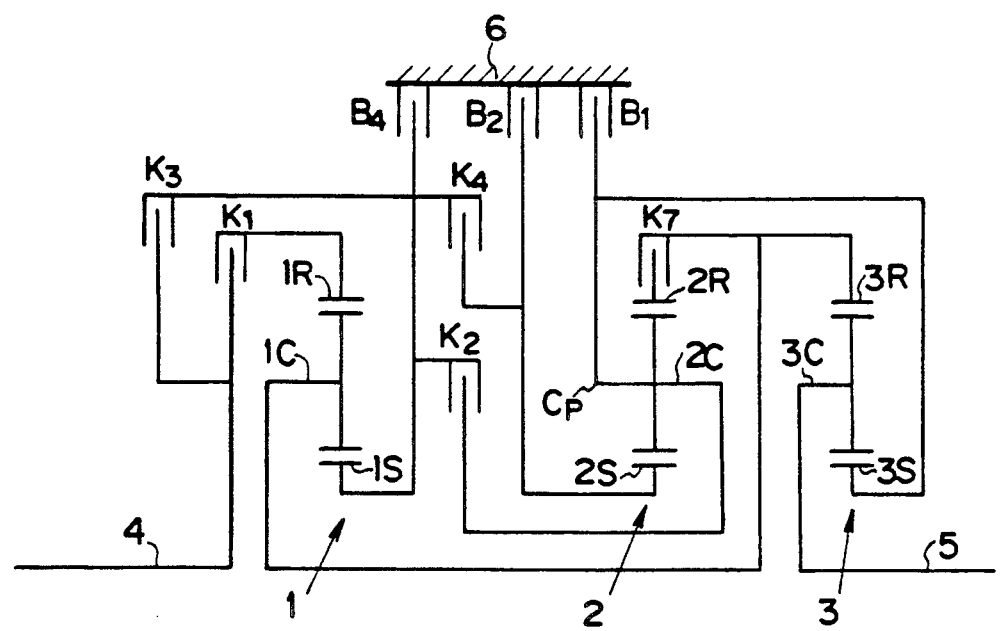

Another embodiment shown in FIG. 19 is modified from the structure of FIG. 18 by providing ninth clutch means K9 for connecting the ring gear 2R of the center planetary gear set 2 to the ring gear 3R of the rear planetary gear set 3 and the carrier 1C of the front planetary gear set 1. The operations are enumerated in Table 13.

TABLE 13

| | Clutch Means | | | | | Brake Means | | |
|---|---|---|---|---|---|---|---|---|
| | K1 | K2 | K3 | K4 | K9 | B1 | B4 | B2 |
| 1st | O | X | X | O | O | O | X | X |
| 2nd | O | X* | X | O* | X* | O* | O* | X* |
| 3rd | O | X | O | O*1 | X*1 | O | X | X |
| 4th | O*2 | O*2 | O*2 | O*2 | O*2 | X | X | X |
| 5th | X | O | O | X | O | X | X | O |
| Rev | X | X | O | O | O | O | X | X |

*The engaged and released states of those clutch means and brake means should not be limited to those, as tabulated, but the corresponding gears can be set by another combination.
*1Either one may be engaged.
*2Either at least three of K1 to K3 or at least four of K1 to K9 may be engaged. In the case of the change between 3rd and 4th gears, K2 is released whereas K4 is engaged. In the case of the change between 4th and 5th gears, K2 is engaged whereas K4 is released.

Figure 20:
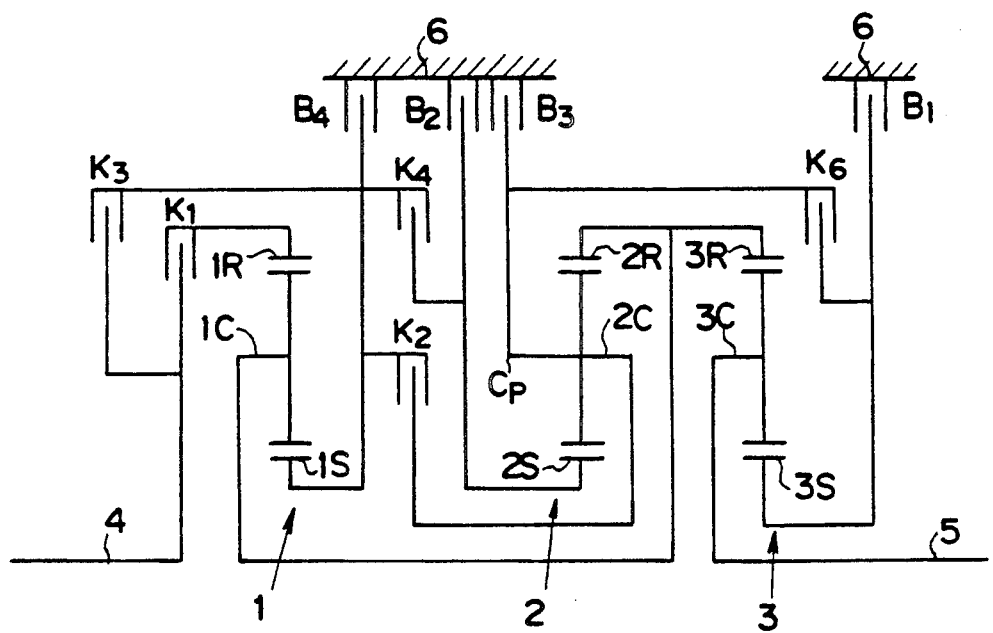

Another embodiment shown in FIG. 20 is modified from the aforementioned structure of FIG. 6 by additionally providing the fourth brake means B4 for braking the sun gear 1S of the front planetary gear set 1 to the casing 6. The operations are enumerated in Table 14.

TABLE 14

| | Clutch Means | | | | | Brake Means | | | |
|---|---|---|---|---|---|---|---|---|---|
| | K1 | K2 | K3 | K4 | K6 | B1 | B4 | B2 | B3 |
| 1st | O | X | X | O | X* | O* | X | X | O* |
| 2nd | O | X*1 | X | O*1 | X*1 | O*1 | O*1 | X*1 | X*1 |
| 3rd | O | X | O | O*2 | X*2 | O | X | X | X |
| 4th | O* | O* | O* | O* | O* | X | X | X | X |
| 5th | X | O | O | X | O | X | X | O | X |
| Rev | X | X | O | O | X* | O* | X | X | O* |

*Any two or more may be engaged.
*1The engaged and released states of those clutch means and brake means should not be limited to those, as tabulated, but the corresponding gears can be set by another combination.
*2Either one may be engaged.
*3Either at least three of K1 to K3 or at least four of K1 to K6 may be engaged. In the case of the change between 3rd and 4th gears, K2 is released whereas K4 is engaged. In the case of the change between 4th and 5th gears, K2 is engaged whereas K4 is released.

In the foregoing individual embodiments, the description of the present invention has been accomplished by exemplifying the arrangements of the brake means B1 and B3 and the clutch means K2 and K4 with respect to the center planetary gear set 2 but should not be limited to those embodiments. As has been described in the first place of the description, the definitions of the front, center and rear positions are merely for conveniences, and these three planetary gear sets can be suitably interchanged. Thus, the aforementioned arrangement relations of the brake means and clutch means relative to the planetary gear sets can also be engaged to the rear planetary gear set, for example. In the individual embodiments shown in FIGS. 3 to 20, on the other hand, the individual engagement means are symbolically indicated by the multi-disc clutches or brakes. As the specific embodiment of FIG. 1 is shown in FIGS. 2(A) and 2(B), each engagement means can be constructed by combining the one-way clutch and the multi-disc clutch or brake or the band brake. More specifically, the structure to be adopted can be found in the Specification and Drawings attached to our Japanese Patent Applications Nos. 63-176270 and 63-221670.

Moreover, the present invention can be applied not only to the automatic transmission which is suited for an FR (i.e., front-engine and rear-drive) vehicle by arranging the input shaft 4 and the output shaft 5 coaxially but also to the automatic transmission which is suited for an FF (i.e., front-engine and front-drive) vehicle by arranging the output shaft in parallel with the input shaft.

Still moreover, the present invention can be applied not only to an automatic transmission adapted to set the five forward and one reverse gears by using the three planetary gear sets but also widely to an automatic transmission adapted to set a plurality of gears by using a plurality of planetary gear sets.

The advantages to be obtained by the present invention will be generally described in the following. In the automatic transmission of the present invention, the rotating members do not need to be arranged radially outside of the clutch means so that the feed and discharge of the oil pressure to the hydraulic servo mechanism for driving those clutch means can be accomplished from the radially outside through the center support which is fixed on the inner surface of the casing. As a result, the oil passages can have their structures simplified. Since there is no element that exerts restrictions upon the external diameters of the clutch means, these clutch means can have the common external diameter so that the clutch means and their driving hydraulic servo mechanisms can share their parts. Since, moreover, the clearance between the sun gear of a planetary gear set and the clutch means connected to the former can be narrowed, their connecting members can be small-sized and made light to have smaller moments of inertia. As a result, the shocks and the durabilities of the clutch means can be advantageously improved.

What is claimed is:

1. An automatic transmission in which a gear train including a plurality of planetary gear sets each composed of a sun gear, a carrier and a ring gear is accommodated with the gear sets in spaced positions along the axis of a casing so that the transmission of a drive force from an input shaft to an output shaft may be changed to set a plurality of gears, comprising:

first brake means connected to the carrier of a first one of said plurality of planetary gear sets for fixing the same to said casing;

first clutch means arranged at the same side as is the connecting portion of the carrier of the first planetary gear set and said first brake means with respect to said first planetary gear set for connecting the carrier of the first planetary gear set selectively to a rotating member; and second clutch means arranged closer to said first planetary gear set than is said first clutch means, for connecting the sun gear of said first planetary gear set selectively to said rotating member, wherein each of said first and second clutch means has at least one portion which comprises a radially outermost rotatable portion of said gear train at an axial position of the transmission in which a respective one of said first and second clutch means is positioned.

2. An automatic transmission according to claim 1, wherein said gears are at least five forward and one reverse gear.

3. An automatic transmission according to claim 1, including second and third planetary gear sets arranged coaxially of said first planetary gear set and said input shaft.

4. An automatic transmission according to claim 3, wherein said first clutch means is adapted to connect the carrier of said first planetary gear set and the sun gear of said second planetary gear set selectively, and wherein said second clutch means is adapted to connect the sun gear of said first planetary gear set and the sun gear of said second planetary gear set selectively.

5. An automatic transmission according to claim 4, wherein said first clutch means and said second clutch means are interposed between said first planetary gear set and said second planetary gear set.

6. An automatic transmission according to claim 4, wherein each of said first, second and third planetary gear sets is of the single-pinion type having pinion gears meshing with the sun gear and ring gear thereof.

7. An automatic transmission according to claim 6, further comprising:

third clutch means for connecting said input shaft and the ring gear of said second planetary gear set selectively;

fourth clutch means for connecting said input shaft and the sun gear of said second planetary gear set selectively; and second brake means for braking the sun gear of said first planetary gear set to said casing, wherein the ring gear of said first planetary gear set and the carrier of said third planetary gear set are connected to each other and to said output shaft, wherein the carrier of said first planetary gear set and the sun gear of said third planetary gear set are connected to each other, and wherein the carrier of said second planetary gear set and the ring gear of said third planetary gear set are connected to each other.

8. An automatic transmission according to claim 7, wherein said second brake means is interposed between said first planetary gear set and said second planetary gear set.

9. An automatic transmission according to claim 7, wherein said second planetary gear set and said third planetary gear set are arranged at opposite sides of said first planetary gear set, and wherein said input shaft is arranged at the opposite side to said first planetary gear set relative to said second planetary gear set.

10. An automatic transmission according to claim 7, wherein said first planetary gear set and said second planetary gear set are at opposite sides of said first clutch means and said second clutch means, and wherein said third planetary gear set is arranged at the opposite side to said first planetary gear set relative to said second planetary gear set.

11. An automatic transmission according to claim 7, wherein said first planetary gear set and said third planetary gear set are at opposite sides of said second clutch means, and wherein said second planetary gear set is arranged at the opposite side to said first planetary gear set relative to said third planetary gear set.

12. An automatic transmission according to claim 7, wherein said first planetary gear set and said third planetary gear set are at opposite sides of said second clutch means, and wherein said second planetary gear set is arranged at the opposite side to said first planetary gear set relative to said third planetary gear set.

13. An automatic transmission according to claim 7, wherein said third clutch means includes a multi-disc clutch.

14. An automatic transmission according to claim 7, wherein said fourth clutch means includes a multi-disc clutch.

15. An automatic transmission according to claim 6, further comprising:

third clutch means for connecting said input shaft and the ring gear of said second planetary gear set selectively;

fourth clutch means for connecting said input shaft and the sun gear of said second planetary gear set selectively;

sixth clutch means for connecting the carrier of said first planetary gear set and the sun gear of said third planetary gear set selectively; and second brake means for braking the sun gear of said first planetary gear set to said casing, wherein the ring gear of said first planetary gear set and the carrier of said third planetary gear set are connected to each other and said output shaft, and wherein the carrier of said second planetary gear set and the ring gear of said third planetary gear set are connected to each other.

16. An automatic transmission according to claim 6, further comprising:

third clutch means for connecting said input shaft and the ring gear of said second planetary gear set selectively;

fourth clutch means for connecting said input shaft and the sun gear of said second planetary gear set selectively; and second brake means for braking the sun gear of said first planetary gear set to said casing, wherein the ring gear of said first planetary gear set and the ring gear of said third planetary gear set are connected to each other and to the carrier of said second planetary gear set, wherein the carrier of said first planetary gear set and the sun gear of said third planetary gear set are connected to each other, and wherein said output shaft is connected to the carrier of said third planetary gear set.

17. An automatic transmission according to claim 4, wherein each of said first planetary gear set and said second planetary gear set is of the single-pinion type having pinion gears meshing with the sun gear and ring gear thereof, and wherein said third planetary gear set is of the double-pinion type in which at least one pair of pinion gears meshing with each other are interposed between the sun gear and ring gear thereof.

18. An automatic transmission according to claim 17, further comprising:

third clutch means for connecting said input shaft and the ring gear of said second planetary gear set selectively;

fourth clutch means for connecting said input shaft and the sun gear of said second planetary gear set selectively; and second brake means for braking the sun gear of said first planetary gear set selectively to said casing, wherein the ring gear of said first planetary gear set and the ring gear of said third planetary gear set are connected to each other and to said output shaft, wherein the carrier of said first planetary gear set and the sun gear of said third planetary gear set are connected to each other, and wherein the carrier of said second planetary gear set and the carrier of said third planetary gear set are connected to each other.

19. An automatic transmission according to claim 17, further comprising:

third clutch means for connecting said input shaft and the ring gear of said second planetary gear set selectively;

fourth clutch means for connecting said input shaft and the sun gear of said second planetary gear set selectively;

sixth clutch means for connecting the carrier of said first planetary gear set and the sun gear of said third planetary gear set selectively; and second brake means for braking the sun gear of said first planetary gear set to said casing, wherein the ring gear of said first planetary gear set and the carrier of said third planetary gear set are connected to each other and to the carrier of said second planetary gear set, and wherein said output shaft is connected to the ring gear of said third planetary gear set.

20. An automatic transmission according to claim 19, further comprising fourth brake means for braking the sun gear of said third planetary gear set to said casing.

21. An automatic transmission according to claim 4, wherein said second planetary gear set is of the double-pinion type, in which at least one pair of pinion gears meshing with each other are interposed between the sun gear and ring gear thereof, and wherein said first planetary gear set and said third planetary gear set are of the single-pinion type having pinion gears meshing with the sun gear and ring gear thereof.

22. An automatic transmission according to claim 21, further comprising:

third clutch means for connecting said input shaft and the carrier of said second planetary gear set selectively;

fourth clutch means for connecting said input shaft and the sun gear of said second planetary gear set selectively; and second brake means for braking the sun gear of said first planetary gear set selectively to said casing, wherein the ring gear of said first planetary gear set and the carrier of said third planetary gear set are connected to each other and to said output shaft, wherein the carrier of said first planetary gear set and the sun gear of said third planetary gear set are connected to each other, and wherein the ring gear of said second planetary gear set and the ring gear of said third planetary gear set are connected to each other.

23. An automatic transmission according to claim 22, wherein said first planetary gear set and said second planetary gear set are at opposite sides of said first clutch means, and wherein said third planetary gear set is arranged at the opposite side to said second planetary gear set relative to said first planetary gear set.

24. An automatic transmission according to claim 21, further comprising:

third clutch means for connecting said input shaft and the carrier of said second planetary gear set selectively;

fourth clutch means for connecting said input shaft and the sun gear of said second planetary gear set selectively;

sixth clutch means for selecting the carrier of said first planetary gear set and the sun gear of said third planetary gear set selectively; and second brake means for braking the sun gear of said first planetary gear set to said casing, wherein the ring gear of said first planetary gear set and the carrier of said third planetary gear set are connected to each other and said output shaft, and wherein the ring gear of said first planetary gear set is connected to the ring gear of said third planetary gear set.

25. An automatic transmission according to claim 21, further comprising:

third clutch means for connecting said input shaft and the carrier of said second planetary gear set selectively;

fourth clutch means for connecting said input shaft and the sun gear of said second planetary gear set selectively; and second brake means for braking the sun gear of said first planetary gear set selectively to said casing, wherein the ring gear of said first planetary gear set and the ring gear of said third planetary gear set are connected to each other and to the ring gear of said second planetary gear set, wherein the carrier of said first planetary gear set is connected to the sun gear of said third planetary gear set, and wherein said output shaft is connected to the carrier of said third planetary gear set.

26. An automatic transmission according to claim 21, further comprising:

third clutch means for connecting said input shaft and the carrier of said second planetary gear set selectively;

fourth clutch means for connecting said input shaft and the sun gear of said second planetary gear set selectively;

sixth clutch means for connecting the carrier of said second planetary gear set and the sun gear of said third planetary gear set selectively; and second brake means for braking the sun gear of said first planetary gear set to said casing, wherein the ring gear of said first planetary gear set and the ring gear of said third planetary gear set are connected to each other and the ring gear of said second planetary gear set, and wherein the carrier of said third planetary gear set is connected to said output shaft.

27. An automatic transmission according to claim 1, wherein said first clutch means includes a multi-disc clutch.

* * * * *